United States Patent [19]

Mutoh et al.

[11] Patent Number: 4,562,524

[45] Date of Patent: Dec. 31, 1985

[54] CONTROL APPARATUS FOR PWM INVERTER

[75] Inventors: Nobuyoshi Mutoh; Keijiro Sakai, both of Hitachi; Motonobu Hattori, Funabashi; Yuichiro Nagato, Chiba, all of Japan

[73] Assignee: Hitachi, Ltd., Tokyo, Japan

[21] Appl. No.: 664,773

[22] Filed: Oct. 25, 1984

[30] Foreign Application Priority Data

Oct. 28, 1983 [JP] Japan .................. 58-200808

[51] Int. Cl.$^4$ ........................................ H02M 7/217
[52] U.S. Cl. ........................................ 363/41; 363/97; 307/265
[58] Field of Search .................. 363/41, 42, 95, 96, 363/97, 98; 307/265, 266, 267

[56] References Cited

U.S. PATENT DOCUMENTS

| | | | |
|---|---|---|---|
| 4,099,109 | 7/1978 | Abbondanti | 307/265 |
| 4,486,824 | 12/1984 | Okuyama et al. | 363/41 |
| 4,494,178 | 1/1985 | Ishima | 363/41 X |
| 4,513,362 | 4/1985 | Aizawa | 363/41 |

OTHER PUBLICATIONS

Wilson et al., Intrinsic Harmonics of Idealized Inverter PWM Systems, IEEE Industry Application Society, 1976 (35-E) pp. 967-973.

*Primary Examiner*—Philip H. Leung
*Attorney, Agent, or Firm*—Antonelli, Terry & Wands

[57] ABSTRACT

A control apparatus for producing a pulse width modulating signal to be used for operation of a PWM inverter wherein a modulating wave of a sinusoidal waveform corresponding to the desired AC output voltage of the inverter is sampled at selected periodical time intervals to obtain a level of the modulating wave at each sampling point and the interval is arithmetically determined between each sampling time point and a time point which appears between the sampling point and the next sampling point and at which time point a virtual triangular waveform, which has positive and negative peaks of a predetermined amplitude occurring alternately at the selected periodical time interval, takes the same level as the sampled level of the modulating wave. On the basis of the time interval, the PWM signal is produced.

5 Claims, 8 Drawing Figures

FIG. 6B

CONTROL APPARATUS FOR PWM INVERTER

The present invention relates generally to a control apparatus for use with a pulse width modulation (PWM) inverter which serves as an alternating current (AC) power supply source of variable voltage and frequency and, more particularly, to a control apparatus for producing a PWM signal for the PWM inverter control.

Heretofore, the control apparatus for producing a PWM signal for controlling a PWM inverter is composed of a circuit for generating a modulating waveform such as a sinusoidal waveform or a stepped waveform approximating to the sinusoidal wave and having a frequency and an amplitude corresponding to those of the AC voltage to be produced by the PWM inverter, a carrier generating circuit for generating a carrier of triangular or saw-tooth waveform, and a PWM signal synthesizing circuit for deriving the PWM signal through comparison of the modulating wave with the carrier, as is described, for example, in the article "Intrinsic Harmonics of Idealized Inverter PWM System" by James W. A. Wilson and Jerome A, Yeamans, IAS 76 Annual, pp. 967–937. In the carrier generating circuit, the use of an oscillator capable of varying the output frequency thereof over a wide range is necessary for changing the frequency of the carrier in accordance with the frequency of the modulating signal with a view of enhancing the availability or utilization factor of the AC output voltage of the inverter on one hand and for increasing the frequency of the carrier for the purpose of improving the form factor of the AC output voltage on the other hand, resulting in a complicated circuit configuration and expensiveness of the control apparatus.

An object of the present invention is to provide a control apparatus for a PWM inverter system which is capable of generating a PWM signal without need for provision of the carrier generating circuit.

In view of the above object, there is provided according to an aspect of the present invention a control apparatus for producing a pulse width modulation signal to be used in operation of a PWM inverter, wherein from a modulating wave of a sinusoidal waveform corresponding to the desired AC output voltage, levels of the modulating wave are sampled, successively, at selected periodical time interval. Subsequently, a time interval is arithmetically calculated between each sampling time point and a time point between that sampling time point and the next sampling time point and at which of a virtual triangular waveform, which has positive and negative peaks of a predetermined amplitude occurring alternatively at the selected periodical interval, takes the same level as the sampled level of the modulating wave at that sampling point. On the basis of the time interval data thus calculated, the PWM signal is produced.

The invention will be described in more detail in conjunction with the accompanying drawings, in which:

FIGS. 5(a and b) are views illustrating a process for determining the phase of the modulating wave at each sampling point with the aid of the counter circuit shown in FIG. 4.

Figure 1:
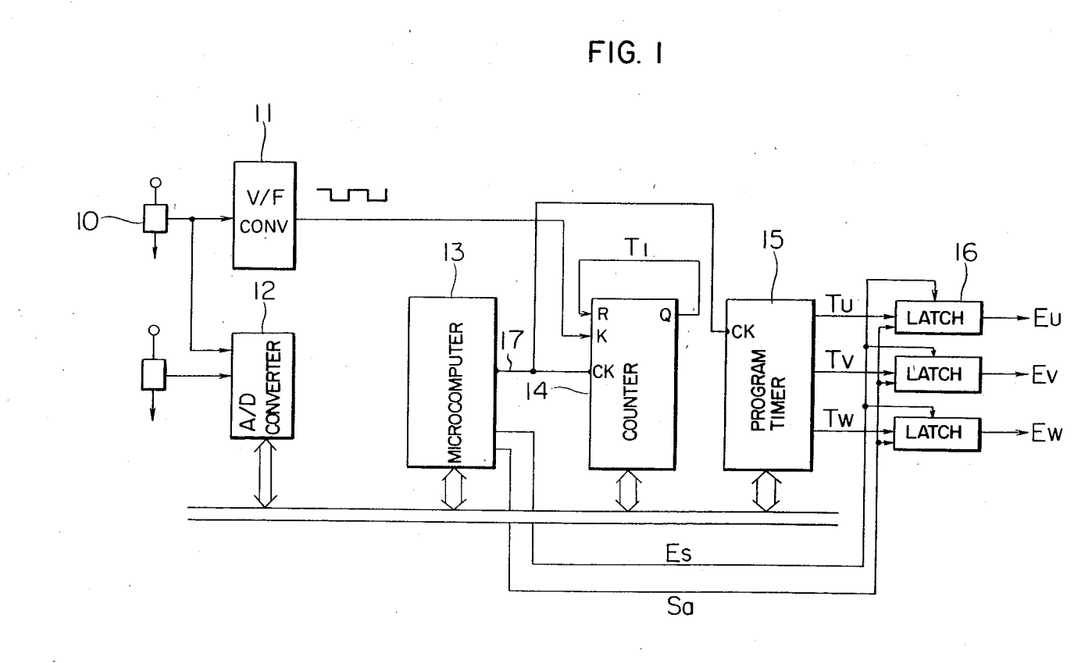
FIG. 1 is a block diagram showing an arrangement of a control apparatus according to an embodiment of the present invention.

Now, the invention will be described by referring to FIG. 1 which shows schematically a general arrangement of the control apparatus according to an exemplary embodiment of the invention. A frequency command voltage $f_R$ indicative of the frequency of a sinusoidal modulating wave corresponding to that of the AC output voltage of an inverter system is generated by means of a potentiometer 10 and supplied to a voltage/frequency (V/F) converter 11. A series of pulses is produced by the V/F converter 11 with a period which is in proportion to the value of the frequency command voltage $f_R$ and applied to a counter circuit 14 at the clock terminal K as a clock signal. The content of the counter circuit 14 is incremented in response to the clock signal until the count value has attained a value corresponding to one cycle of the sinusoidal wave, whereupon a pulse $T_1$ is produced from the output Q of the counter circuit 14. This pulse signal $T_1$ is applied to a reset terminal R of the counter circuit 14, whereby the content thereof is reset. Subsequently, the counter circuit 14 starts again the counting in the incrementing direction in response to the clock pulses. This operation of the counter circuit 14 is periodically repeated. The content of the counter circuit 14 is read out by a single-chip micro-computer 13 at time points which correspond to sampling points of the sinusoidal wave. On the basis of the content of the counter circuit, phase positions $\theta$ of the sinusoidal wave at the sampling points are determined by the micro-computer 13, as will be described in detail hereinafter. The micro-computer 13 includes a group of memories such as RAM, EPROM, counter devices, input/output ports and others.

The micro-computer 13 fetches also a digital signal produced by an analogue-to-digital or A/D converter 12 which serves to convert a voltage command signal KH relating to the amplitude value of the aforementioned sinusoidal modulating wave into a digital signal. On the basis of the values of $\theta$ and KH, the micro-computer 13 arithmetically determines the pulse width of a pulse width reference signal in accordance with an expression (1) mentioned hereinafter, which pulse width reference signal in turn provides a basic quantity in determining the PWM signal. This pulse width is equal to a time interval ($\tau_- = \overline{AB}$ or $\tau_+ = \overline{CD}$ in FIG. 2) between one sampling point and the time point at which the aforementioned virtual triangular wave takes the same level as that of the sinusoidal wave at the one sampling point. The pulse width thus determined is set at a programmable timer 15 constituted by a sort of counter.

The micro-computer 13 generates a rectangular signal Es which takes a high level and a low level alternately every period $\tau_c$ which corresponds to a half-cycle of the aformentioned virtual triangular wave, the signal Es being supplied to a latch circuit 16. The programmable timer 15 serves to produce a pulse width reference signal TU on the basis of the set value of the pulse width in the following manner. The value of $\tau_-$ or $\tau_+$ calculated by the microcomputer is set into the programmable timer 15 in response to an interruption signal produced in synchronism with the leading or trailing edge of the signal Es. The programmable timer 15 is initiallized upon setting the value of $\tau_-$ or $\tau_+$ so as to reset the content of its counter and change its output from low level to high level, and then starts to count an enable signal E of a constant frequency, as clock signal, derived from the microcomputer 13. When the counts of the programmable timer 15 reach the set value of $\tau_-$ or $\tau_+$, its output is changed from the high level to the low level. Thus, the programmable timer 15 produces, as its output, the pulse width reference signal Tu having a pulse width of $\tau_-$ or $\tau_+$.

The PWM signal Eu is produced by a latch circuit 16 on the basis of the pulse width reference signal Tu and the signal Es in a manner as mentioned below. The latch circuit 16 is constituted by a D-type flip-flop having a data terminal supplied with the signal Es and a clock terminal supplied with the signal Tu. At the time point corresponding to the trailing edge of the signal Tu, the latch circuit 16 fetches the signal Es and make the PWM signal Eu high level when the signal Es as fetched is at high level and low level when the signal fetched Es is at low level. In the case of a polyphase inverter, the programmable timer 15 produces a plurality of the pulse width reference signals different phases, respectively, corresponding to the phases of the inverter and, a number of latch circuits 16 are provided correspondingly to the pulse width reference signals, respectively, to thereby produce the PWM signal for each of the phases of the inverter. For example, in the case of the three-phase inverter system as illustrated, the programmable timer 15 is so arranged as to produce in addition to the signal Tu the pulse width reference signals Tv and Tw which are of the same waveform as the signal Tu but are out of phase with the latter by 120° and 240°, respectively, wherein the three-phase PWM signals Eu, Ev and Ew are produced by the latch circuits 16 provided in correspondence with the pulse width reference signal Tu, Tv and Tw. A suppression signal Sa supplied to the latch circuits 16 from the microcomputer 13 is utilized for suppressing the outputs of these latch circuits until they have been set in the normal state upon initialization for activation of the control apparatus.

The arrangement of the control apparatus according to the invention has been outlined above. Now, the principle of modulation contemplated by the invention will be elucidated in more detail by referring to FIGS. 2 and 3.

Figure 2:
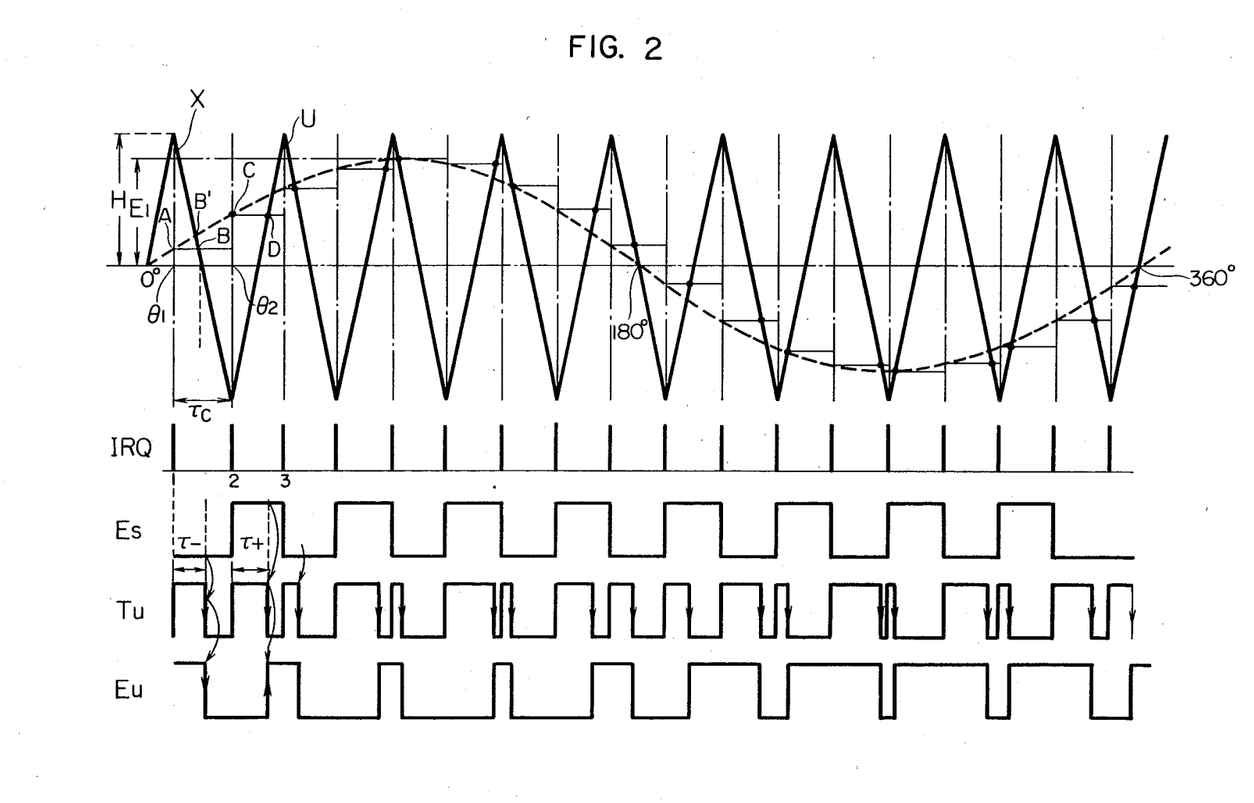
FIG. 2 is a view for illustrating the underlying concept of the invention for deriving the PWM signal when the amplitude ratio is smaller than 1 (unity)
Figure 3:
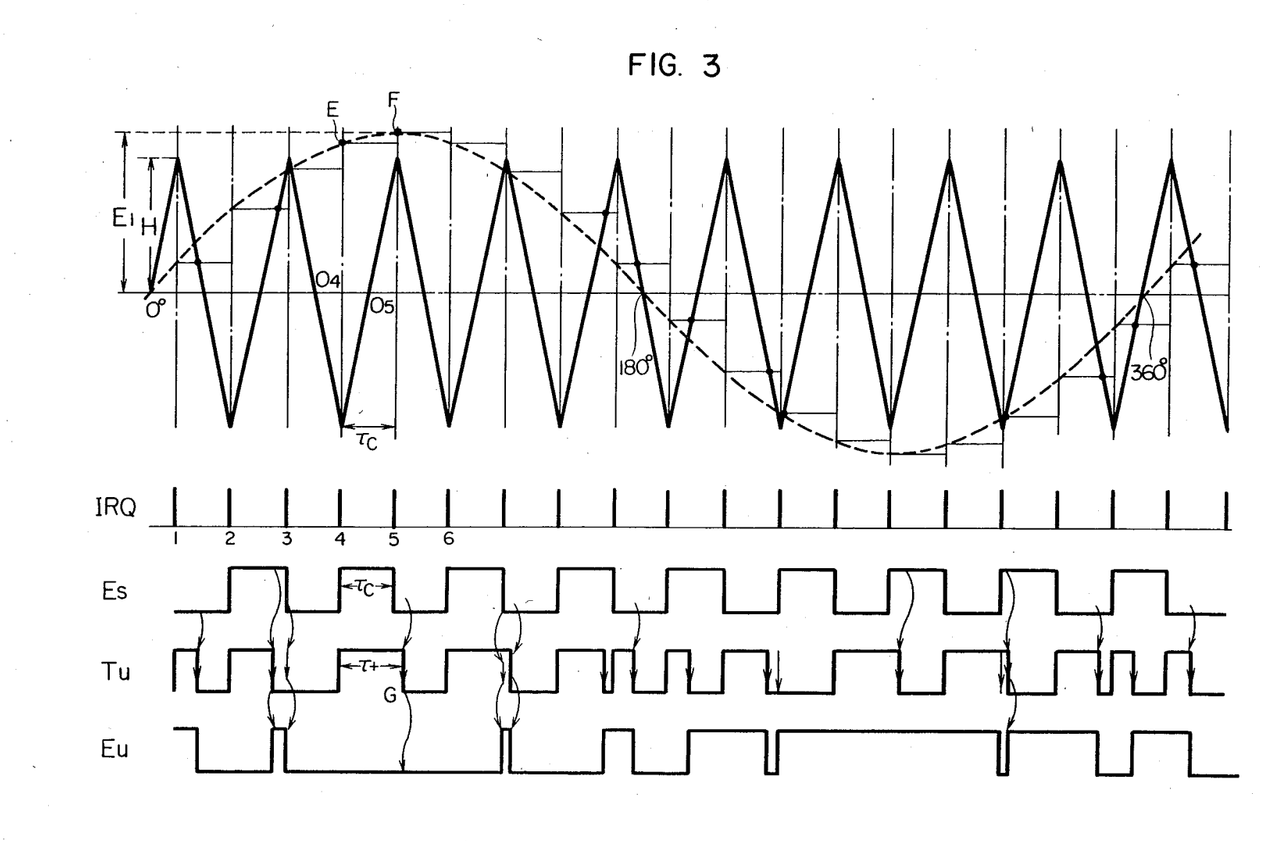
FIG. 3 is a view for illustrating the principle of the invention for deriving the PWM signal when the amplitude ratio is greater than 1.

FIG. 2 illustrates the principle of modulation when the amplitude ratio KH (i.e. ratio of the peak value $E_1$ of the sinusoidal waveform and the peak value H of the virtual triangular waveform is less than 1 (unity), while FIG. 3 illustrates the modulation when the amplitude ratio is greater than 1 (unity). In both figures, the triangular waveforms are not actually produced but depicted for the convenience of description and thus referred to as the virtual waveform. In the following, the process for deriving the PWM signal Eu will be elucidated by using symbols shown in FIG. 2.

The micro-computer 13 is so programmed that interrupt request signals (hereinafter also referred to as IRQ signal) are produced at time points corresponding to the positive and negative peak points of the virtual triangular waveform X with a periodical time interval or period $\tau_c$ corresponding to a half period of the virtual triangular waveform X which corresponds to the carrier in the hitherto known PWM inverter control apparatus. In response to the IRQ signal, the level A of the sinusoidal waveform U having a frequency determined by the frequency command $f_R$ and an amplitude $E_1$ determined by the voltage command $K_H = E_1/H$ (where H represents the amplitude of the virtual triangular wave which is constant) is determined in accordance with $A = E_1 \sin \theta$ at a time point when the IRQ signal is generated (e.g. for the phase position $\theta_1$ corresponding to the first IRQ 1, the level A is given by $A = E_1 \sin \theta_1$). Subsequently, the time interval or width $\tau_-$ between the point A and a point B at which a portion of the virtual triangular wave between its peak corresponding to the IRQ 1 signal and its next peak of opposite polarity takes the same level as the level A is calculated in accordance with the following expression (1) to give the pulse width of the pulse width reference signal.

$$\tau_- = \frac{\tau_c}{2} \left( 1 - \frac{E_1}{H} \cdot \sin\theta_1 \right) \quad (1)$$

$$= \frac{\tau_c}{2} (1 - K_H \cdot \sin\theta_1)$$

The value of the pulse width $\tau_-$ as calculated in accordance with the above expression (1) differs slightly from the value obtained by the hitherto known modulation system (which value is derived from an intersection B' between the sinusoidal waveform represented by a broken curve and the triangular waveform). It has been, however, ascertained that such difference provides no problem in practical application by selecting the period or time interval $\tau_c$ of the IRQ signal to be sufficiently short when compared with the frequency $f_1$ of the sinusoidal waveform (e.g. $1/\tau_c > 5f_1$).

In response to the interrupt signal IRQ 1, the micro-computer calculates the value of $\tau_-$ in accordance with the expression (1), and the value thus determined is set in the programmable timer 15 immediately before occurrence of the next interrupt signal IRQ 2. Then, the programmable timer 15 starts counting of the enable signal E, as clock pulse, supplied from the micro-computer 13, to thereby produce the pulse width reference signal Tu which is at high level from the start of the counting to a time point when the counted value reaches the set value mentioned above and rendered low level thereafter. In this way, when the interrupt signal IRQ 1 makes appearance, the micro-computer 13 calculates the value of the pulse width $\tau_-$, which is followed by generation of the pulse width reference signal Tu by the programmable timer 15 at a time point subtantially corresponding to the next interrupt signal IRQ 2, wherein the generated pulse width reference signal is initially at high level and takes low level after lapse of time equal to $\tau_-$. For the purpose of facilitating the understanding of relationship between the pulse width $\tau_-$ and the pulse width reference signal Tu, waveforms illustrated in FIG. 2 are so plotted that the signal Tu corresponding to the value of $\tau_-$ determined in response to the interrupt signal IRQ 1 assumes high level simultaneously with occurrence of the interrupt signal IRQ 1. It should however be appreciated that the signal Tu takes in reality the high level at the time point substantially corresponding to the next interrupt signal IRQ 2 with a delay almost equal to the period $\tau_c$ of the interrupt signal IRQ. Similarly, the signal Es and the PWM signal Eu described below are in reality generated with the same delay as that of the signal Tu, although these signals are illustrated in FIG. 2 on the assumption that they are generated without delay. Further, it should be appreciated that the following description is also made on the assumption that the delay is neglected for convenience sake.

As described hereinbefore, the micro-computer 13 produces the rectangular signal Es having high level and low level alternating at every time interval $\tau_c$. This signal Es corresponds to the signal which assumes low level during a time interval corresponding to that of negative slope of the virtual triangular wave (i.e. time interval between the interrupt signal IRQ 1 and IRQ 2) while assuming high level during the time interval corresponding to that of the succeeding positive slope of the virtual triangular wave (i.e. time interval between the signals IRQ 2 and IRQ 3) in synchronism with the occurrence of the interrupt signal IRQ. Although the signal Es is so illustrated in FIG. 2 that low and high levels thereof correspond, respectively, to negative and positive slopes of the virtual triangular waveforms, it should be appreciated that the correspondence may be reversed such that the signal Es are at high and low levels when the slope of the triangular waveform is positive and negative, respectively. In the latter case, the PWM signal described below is simply of the inverted form.

According to the invention, the PWM signal is produced on the basis of the signals Es and Tu produced through the processes described above. More specifically, data or value of the signal Es (i.e. high level or low level) is fetched at a time point corresponding to the trailing edge of the signal Tu (the time point indicated by an arrow in FIG. 2) to thereby produce the PWM signal.

In more concrete, reference is again made to FIG. 2. It will be seen that the rectangular signal Es is at low level during the time interval between the interrupt signals IRQ 1 and IRQ 2 in correspondence to the negative slope of the virtual triangular waveform. By fetching or sampling the rectangular signal Es of low level after elapse of time $\tau_-$ at the time point corresponding to the trailing edge of the pulse width reference signal Tu outputted by the programmable timer 15, the PWM signal Eu transits from high level to low level which is held until the time point corresponding to the trailing edge of the next pulse width reference signal Tu outputted from the timer 15.

Next, description will be made as to how the PWM signal is produced in the time interval between the interrupt signals IRQ 2 and IRQ 3.

Also at the time point corresponding to the appearance of the signal IRQ 2, the pulse width $\tau_+$ of the pulse width reference signal Tu to be set in the programmable timer 15 is determined through the procedure similar to that adopted in determining the pulse width $\tau_-$ in response to the interrupt signal IRQ 1. More specifically, in response to the interrupt signal IRQ 2, phase position $\theta_2$ of the sinusoidal wave is determined, which is followed by determination of the level C of the sinusoidal wave at a point C corresponding to the phase position $\theta_2$ in accordance with $C = E_1 \sin \theta_2$. Subsequently, the time interval $\tau_+$ between the point C and a point D which lies on the positive slope of the virtual triangular wave rising up in response to the signal IRQ 2 and at which the virtual triangular wave takes the same level as the level of the sinusoidal wave at the point C is calculated with the aid of the micro-computer 13 in accordance with the following expression:

$$\tau_+ = \tau_c/2(1 + K_H \cdot \sin \theta_2) \qquad (2)$$

where $K_H = E_1/H$.

When the expressions (1) and (2) are compared with each other, it is seen that they differs in respect with the sign of the second term on the right hand side. Accordingly, both expressions (1) and (2) can be represented by a generalized form:

$$\tau = \tau_c/2(1 + K_S \cdot K_H \cdot \sin \theta) \qquad (3)$$

where
$K_S = 1$ when Es is at low level, and
$K_S = -1$ when Es is at high level.

The pulse width $\tau_+$ of the pulse width reference signal Tu resulting from the arithmetic determination in accordance with the expression (2) is set at the program timer 15. The pulse width reference signal Tu outputted from the timer 5 through the process similar to that described hereinbefore assumes high level substantially in synchronism with the IRQ signal and returns low level after lapse of time $\tau_+$. The latch circuit 16 fetches the data of the signal Es (i.e. data of high or low level of the signal Es) at a time point coresponding to the trailing edge of the signal Tu falling to the low level, resulting in that the PWM signal Eu transits to the level corresponding to that of the signal Es, i.e. high level in the illustrated case.

Succeeding to the time point corresponding to the interrupt signal IRQ 2, the processes as described are repeated thereby to produce the PWM signal Eu of the waveform as illustrated in FIG. 2.

The foregoing description has been made on the assumption that the rectangular waveform signal Es is sampled at the time point corresponding to the high-to-low level transition of the pulse width reference signal Tu to produce the PWM signal. However, it will be understood that same result can equally be obtained in case the pulse width reference signal Tu is inverted. In this case, the rectangular waveform signal Es is fetched or sampled at the leading edge or the low-to-high level transition of the inverted signal $\overline{Tu}$. In any case, the rectangular waveform signal Es is fetched after the time lapse which corresponds to the value set at the programmable timer 15.

Next, referring to FIG. 3, description will be made concerning a method of increasing the voltage utilization factor by using the PWM system described above. In application where the PWM signal Eu is employed, the output voltage becomes at maximum when the amplitude ratio $K_H (= E_1/H)$ is 1 (unity). For increasing the voltage further, the amplitude ratio KH need to be increased higher than 1. FIG. 3 shows a relationship between the sinusoidal waveform and the virtual triangular waveform for the amplitude ratio greater than 1. At the time points corresponding to the interrupt signals IRQ 4 and IRQ 5, the peak value H of the triangular wave is less than the peak value $E_1$ of the sinusoidal waveform. Thus, the amplitude ratio is greater than 1.

Under the condition, a method of forming the PWM signal at these time points will be described. At the time point of appearance of the interrupt signal IRQ 4, the corresponding phase position $\theta_4$ of the sinusoidal wave is fetched by the micro-computer 13 to determine the value of the pulse width $\tau_+$ of the pulse width reference signal Tu in accordance with the expression (2). Since the value of KH sin $\theta_4$ is greater than 1 at this time, the pulse width $\tau_+$ of the pulse width reference signal Tu is greater than the value of the period $\tau_c$ of the IRQ signal. The value of the pulse width $\tau_+$ is set at the programmable timer 15.

At a succeeding time point corresponding to the IRQ 5, the slope of the virtual triangular wave becomes negative, and the rectangular waveform Es transits to the low level. Accordingly, for determining the value of $\tau_-$ in accordance with the expression (1), the phase position $\theta_5$ at the time point corresponding to the interrupt signal IRQ 5 is read and the value of the term $K_H$ sin $\theta_5$ is determined, the result of which will, however, show that the value of this term is greater than 1, and thus the value of $\tau_-$ is negative. In this case, the value of $\tau_-$ is set to zero. In other words, no value is loaded in the programmable timer 15, and thus the range of $\tau_-$ is so determined as to satisfy the condition that $\tau_- \geq 0$. Under the conditions, the data $\tau_+$ determined at the time point corresponding to the preceding interrupt signal IRQ 4 remains in the programmable timer 15. Accordingly, after the time lapse of $\tau_+$, the output signal Tu of the programmable timer 15 changes from the high level to the low level at a point G shown in FIG. 3. In this case, since the value of $\tau_+$ is greater than $\tau_c$, the point G occurs during the low level state of the rectangular signal Es, involving no change in the sign of the PWM signal Eu, as shown in FIG. 3, which means that the output voltage is correspondingly increased. When the number of such processes in which the sign of the PWM signal remains unchanged is increased, the output voltage is correspondingly increased. In this case, voltage regulation can be performed by varying the amplitude ratio KH. It will now be understood that the utilization factor of the output voltage can be increased through the simplified procedure.

Figure 4:
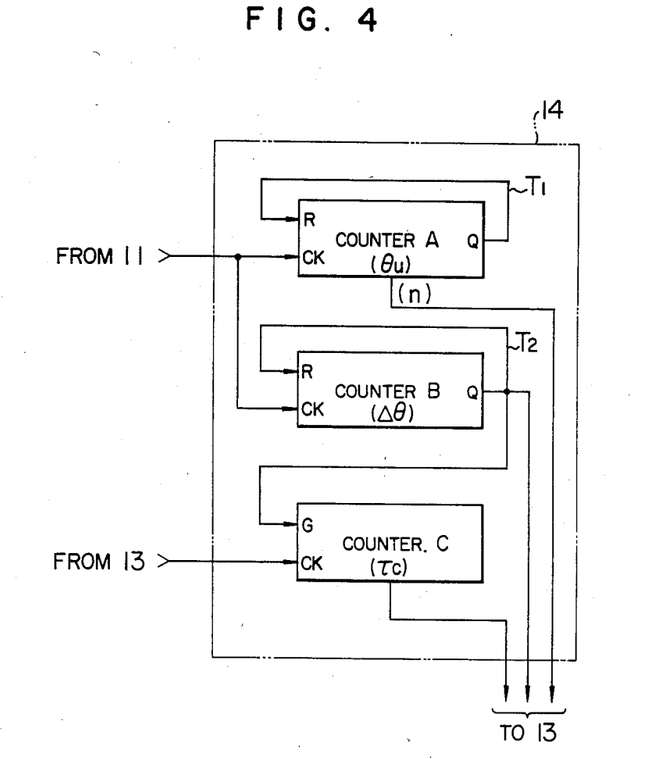
FIG. 4 is a view showing an arrangement of a counter circuit shown in FIG. 1.

Next, a process for determining the level of the sinusoidal wave at every periodical time interval $\tau_c$ in response to the interrupt signal IRQ with the aid of the counter circuit 14 will be described by referring to FIGS. 4 and 5. The counter circuit 14 is provided with three counters A, B and C as shown in FIG. 4. The counter A counts the pulses derived from the V/F converter 11 and produces at the terminal Q a pulse signal $T_1$ when its counts reach a value corresponding to one cycle $\theta'u$ of the sinusoidal wave U. The signal $T_1$ is applied to a reset terminal of the counter A thereby resetting the same. Since the signal $T_1$ is produced each one cycle of the sinusoidal wave U, the count value of the counter A represents the phase position in each cycle of the sinusoidal wave U. The count value of the counter A is fetched by the micro-computer 13 in response to each interrupt signal.

The counter B also counts the pulses derived from the V/F converter 11 and produces a pulse signal $T_2$ when its counts reach a value corresponding to a predetermined phase angle $\Delta\theta$. The signal $T_2$ is applied to a reset terminal R of the counter B thereby resetting the same and also to the gate terminal G of the counter C.

The period $\tau_c$ of the interrupt signal IRQ may be either constant or variable so as to be inversely proportional to the frequency $f_R$ of the sinusoidal wave. In the latter case, the interrupt signal IRQ is produced periodically at a predetermined phase interval of the sinusoidal wave irrespective of its frequency. By selecting the value of $\Delta\theta$ as above-mentioned equal to the last-mentioned predetermined phase interval, the pulse signal $T_2$ may be used as the interrupt signal in the mode of the period $\tau_c$ being variable and the period $\tau_c$ is given by the following equation:

$$\tau_c = \Delta\theta/360° \times 1/f_R \qquad (4)$$

The counter C counts the enable signal 17, as clock pulse, supplied from the micro-computer 13 and the counting operation thereof is reset by the signal $T_2$ so that the content of the counter C just before resetting the same represents as time interval between two successive pulse signals $T_2$, that is the value of $\tau_c$ in the variable $\tau_c$ mode where the signal $T_2$ is used as the interrupt signal. The value of $\tau_c$ obtained by the counter C is taken by the micro-computer to be used for calculation of $\tau_{31}$ or $\tau_+$ in the variable $\tau_c$ mode.

In the mode of $\tau_c$ being constant, the interrupt signal IRQ is produced by a PWM timer (not shown) contained in the micro-computer by setting into the timer data corresponding to the constant value of $\tau_c$ so that the timer produces an output, as the interrupt signal, periodically at a time interval of $\tau_c$.

In any case, the micro-computer 13 fetches the count value of the counter A in response to the interrupt signal. As mentioned hereinbefore, the count value of the counter A represents the phase position $\theta$ of the sinusoidal wave at the time point when the interrupt signal appears. The micro-computer 13 reads the value of sin $\theta$ out of a table which is provided in the micro-computer and stores the values of sin $\theta$ for various values of $\theta$. The value of sin $\theta$ thus read-out is used for calculation of $\tau_-$ and $\tau_+$.

In the mode of the value of $\tau_c$ being constant, the noise produced from a motor driven at a low speeds by the PWM inverter can be reduced, while in the mode of the value of $\tau_c$ being variable, the balance between different phases is assured, which is especially advantageous when the frequency $f_R$ is high. Thus, the advantages of the respective modes can be realized by operating the apparatus in the constant $\tau_c$ mode when the frequency $f_R$ is less than a predetermined frequency $f_o$ and in the variable $\tau_c$ mode when the frequency $f_R$ is not less than the frequency $f_o$. In this combined mode, the micro-computer 13 is programmed to compare the frequency command $f_R$ with the predetermined frequency $f_o$ and use the output of the PWM timer as the interrupt signal when $f_R < f_o$ and the output signal $T_2$ of the counter B provided in the counter circuit 14 as the interrupt signal when $f_R \geq f_o$.

Figure 5:
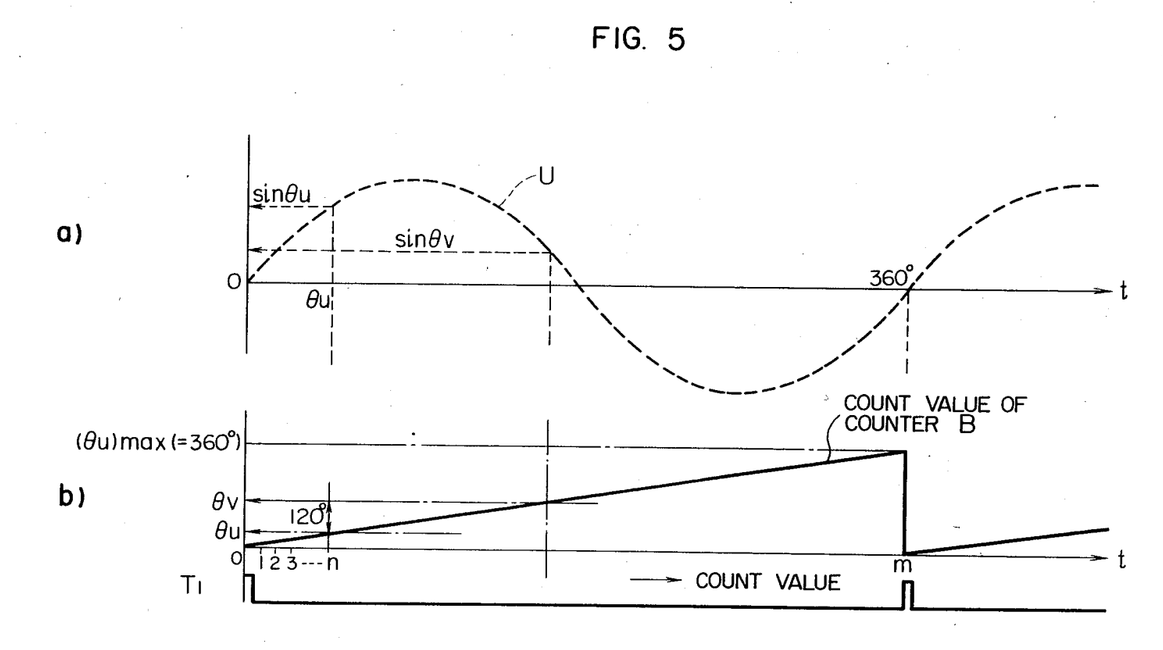

FIG. 5 shows a relationship between the count value of the counter A and the value sin $\theta$ of the sinusoidal wave, typically in the phase U of a three-phase inverter. As mentioned hereinbefore, the counter A produces the pulse $T_1$ when its counts reach a value m corresponding to one cycle $\theta'u$ of the sinusoidal wave and the pulse $T_1$ resets the counter A. The count value n of the counter A is representatie of the phase $\theta u$ of the sinusoidal wave with a relationship therebetween given by an expression $\theta u = n \times 360°/m$. The micro-computer 13 fetches the value of n in response to the interrupt signal, calculates the value of $\theta u$ according to the above expression and reads the value of sin $\theta u$ out of the table contained therein.

In the case of the three-phase inverter, the PWM signal has to be prepared for each of the phases U, V and W. In that case, the values of $\theta_v$ and $\theta_w$ of the V-phase and the W-phase can be determined in accordance with $\theta_v = \theta_u - 120°$ and $\theta_w = \theta_u - 240°$, respectively, by making use of the value of $\theta_u$ determined for the U-phase. The corresponding values of $\sin \theta_v$ and $\sin \theta_w$ are read out from the ROM.

Next, processes excuted by the micro-computer 13 for producing the three-phase PWM signals with the apparatus shown in FIG. 1 will be described by referring to flow charts shown in FIGS. 6A and 6B.

Figure 6A:
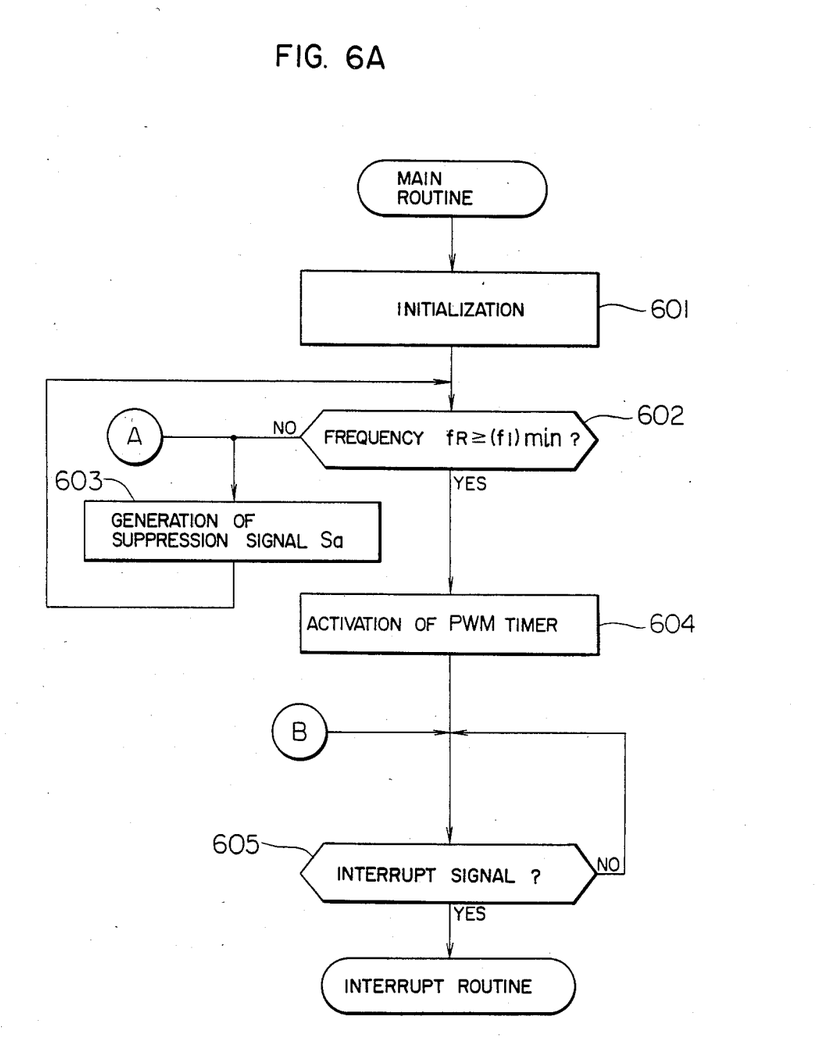
FIGS. 6A and 6B are flow charts showing processes executed by a micro-computer shown in FIG. 1.
Figure 6B:
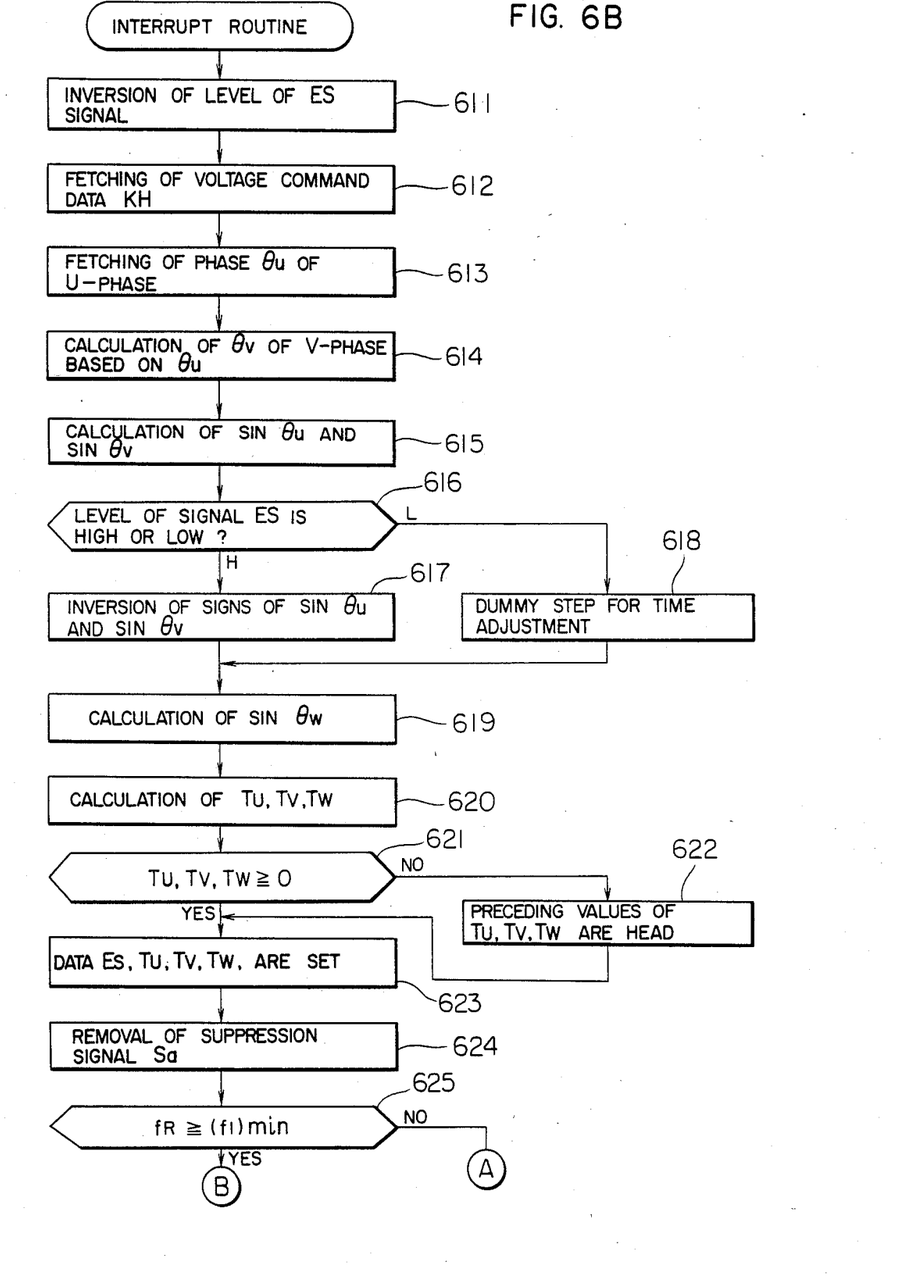

When the control apparatus is powered on, a main routine illustrated in FIG. 6A is activated, whereupon initialization is effected at a step 601. This initialization process includes initialization of work areas of the memory, initialization of the program timer 15, setting of the mode of $\tau_c$, i.e. the constant $\tau_c$ mode or the variable $\tau_c$ mode or the combined mode, and the porcess for suppressing the generation of the PWM signal by producing the suppression signal Sa. At a next step 602, the frequency command $f_R$ is inputted and compared with a predetermined lower limit value $(f_1)_{min}$ of the frequency of the inverter. When the comparison results in that the frequency command $f_R$ is not greater than $(f_1)_{min}$, the process proceeds to a step 603 where the suppression signal Sa is produced from the output port of the microcomputer 13 to thereby maintain the state in which the generation of the PWM signal is inhibited. When the commanded frequncy $f_R$ exceeds $(f_1)_{min}$, the process proceeds to a step 604 where the processing is executed for activating the PWM timer incorporated in the micro-computer. In the constant $\tau_c$ mode, the counter or PWM timer of the micro-computer 13 is loaded with the data $\tau_c$ which corresponds to a half of the period of the virtual triangular wave so that the IRQ signal shown in FIGS. 2 and 3 are produced. As described hereinbefore, the signal IRQ provides the interrupt signal for executing the PWM control processing. In the variable $\tau_c$ mode, preparation is made such that output pulse $T_2$ of the counter B shown in FIG. 4 is used as the IRQ signal. On the other hand, in the combined mode, the step includes comparison of the frequency $f_R$ with the predetermined frequency $f_o$ and determination as to which of the output of the PWM timer and the output $T_2$ of the counter B is used as the interrupt signal. Thus, the preparation procedure has been completed. Then, generation of the interrupt signal is awaited at a step 605. Upon appearance of the interrupt signal, execution of the interrupt routine illustrated in FIG. 6B is started.

At first, the level of the signal Es (which is set at high level at the stage of initialization) is inverted and the level resulting from the inversion is stored at the work area at a step 611. Next, at a step 612, the A/D converter 12 is activated to allow the command voltage $K_H$ to be inputted. At a step 613, the phase $\theta_u$ of the U-phase sinusoidal wave is determined from the value available from the latch 43 (FIG. 4) of the counter circuit 14, and on the basis of the determined phase $\theta_u$ the phase $\theta_v$ of the V-phase sinusoidal wave is determined at a step 614. At a succeeding step 615, the values $\sin \theta_u$ and $\sin \theta_v$ of the sinusoidal waves which are corresponding to the phases positions $\theta_u$ and $\theta_v$, respectively, are read out from the ROM. Next, at a step 616, the level of the signal Es (which is previously determined in correspondence with the positive or negative slope of the virtual triangular wave, e.g. high level for the positive slope and low level for the negative slop) is discriminated. In the case of the illustrated example, when the level of the signal Es is high, the process proceeds to a step 617 where the signs of $\sin \theta_u$ and $\sin \theta_v$ are inverted.

On the other hand, when the signal Es is at low level, a dummy step is executed as indicated at a step 618.

At the dummy step 618, the signs of $\sin \theta_u$ and $\sin \theta_v$ are left as they are. This dummy step is provided for the purpose of adjusting the processing time so that the succeeding step 619 maybe executed after lapse of time equal to the time required for executing the step 617. Through the processing of the signs of the $\sin \theta_u$ and $\sin \theta_v$, there can be eventually obtained the term $K_S \sin \theta_u$ and $K_S \sin \theta_v$ included in the expression (3). Next, at a step 619, value of $\sin \theta_w$ is arithmetically determined in accordance with $\sin \theta_w = (0 - \sin \theta_u - \sin \theta_v)$. Alternatively, it is of course possible to execute a step for determining $\theta_w$ in succession to the step 614 to read out the value of $\sin \theta_w$ corresponding to the determined $\theta_w$ from the table.

On the basis of the data of $\sin \theta_u$, $\sin \theta_v$ and $\sin \theta_w$ (inclusive of signs thereof) and the fetched data of $K_H$, the values to Tu, Tv and Tw are arithmetically determined in accordance with the expression (3), i.e.

$$Tu = \tau_c/2(1 + K_S \cdot K_H \cdot \sin \theta_u),$$

$$Tv = \tau_c/2(1 + K_S \cdot K_H \cdot \sin \theta_v),$$

and $$Tw = \tau_c/2(1 + K_S \cdot K_H \cdot \sin \theta_w)$$

at a step 620. Next, at a step 621, it is decided whether the determined values Tu, Tv and Tw are positive or negative. When positive or 0 (zero), the determined values are set at the programmable timer 15 at a step 623, while for the negative values the values placed in the timer 15 until then are held as they are. Simultaneously, data of the signal Es (i.e. high level or low level) is set at the latch circuit 16.

Subsequently, at a step 624, the suppression signal Sa is removed to enable the latch circuit 16. Further, it is confirmed at a step 625 whether or not the commanded frequency $f_R$ is greater than $(f_1)_{min}$. When $f_R \geq (f_1)_{min}$, the step 605 of the main routine is restored for waiting for the next interrupt signal. When $f_R < (f_1)_{min}$, the step 603 of the main routine is regained to produce again the suppression signal Sa, to inhibit the output of the latch circuits 16 until $f_R \geq (f_1)_{min}$.

When the data Es, Tu, Tv and Tw are set at the latch circuits and the programmable timer through the procedure described above, there are produced from these set values the signals for determining the levels of the PWM signals Eu, Ev and Ew by the latch circuits 16 in the succeeding interrupt cycle.

As will be appreciated from the foregoing description, it is possible according to the invention to produce the PWM signal with a much simplified circuit configuration without necessity for providing the circuit for generating actually the carrier such as of triangular waveform. Further, the frequency of the virtual carrier can be varied in a facilitated manner through software technique. Besides, by virtue of the fact that the switching frequency which is optimum for the characteristics of power switching elements of the PWM inverter can be selected without modifying the configuration of the PWM control circuit. There is thus provided a PWM inverter which can enjoy an increased flexibility in use, to great advantages.

We claim:

1. A control apparatus for generating a pulse width modulation signal to be used for operating a pulse width modulation inverter, comprising:

means for generating a rectangular signal which assumes alternately high level and low level at every selected periodical time interval;

means for sampling at every periodical time interval a modulating wave whose level varies in the form of a sinusoidal waveform of a frequency and an amplitude determined, respectively, by a given frequency command and a given voltage command to thereby determine the levels of said modulating wave at each of the sampling time points;

means for determining time interval between said sampling time point and a point of a virtual triangular wave which has positive and negative peaks of a predetermined value alternating at every periodical time interval, said point being positioned on a segment of said virtual triangular wave extending between the peak of said virtual triangular wave corresponding to said sampling time and the succeeding peak of the opposite polarity at a same level as that of said modulating waveform at said sampling time point; and means for generating the pulse width modulation signal on the basis of said time interval and the level of said rectangular signal at a time point which corresponds to time lapse of said time interval from said sampling point for which said time interval has been determined.

2. A control apparatus according to claim 1, wherein said means for determining the level of said modulating wave include means for determining phase of said sinusoidal wave at each of said sampling time points and means for determining a value of sin $\theta$ from said phase, wherein said time interval is arithmetically determined in accordance with expressions given by:

$$\tau_- = \tau_c/2(1 - K_H \cdot \sin \theta) \quad (1)$$

$$\tau_+ = \tau_c/2(1 + K_H \cdot \sin \theta) \quad (2)$$

where $K_H$ is a value given by said voltage command and representative of ratio between the amplitude of said sinusoidal wave and the amplitude of said virtual triangular wave.

3. A control apparatus according to claim 1, wherein said periodical time interval is constant.

4. A control apparatus according to claim 1, wherein said periodical time interval is variable in dependence on said frequency command so that the number of samplings performed during a single cycle of said modulating waveform is constant.

5. A control apparatus according to claim 1, wherein said periodical time interval is constant when the value of said frequency command is in a predetermined low frequency range, while said periodical time interval is variable in dependence on said frequency command so that the number of the samplings taking place during a single cycle of said modulating waveform is constant.

* * * * *